United States Patent [19]

Wilson

[11] Patent Number: 4,615,416

[45] Date of Patent: Oct. 7, 1986

[54] HEAVY DUTY CHOCKS

[75] Inventor: Michael F. Wilson, Alton, England

[73] Assignee: R.E. Tyre & Rubber Co., Ltd., Hampshire, England

[21] Appl. No.: 729,881

[22] Filed: May 1, 1985

Related U.S. Application Data

[63] Continuation-in-part of Ser. No. 497,101, May 20, 1983, abandoned.

[30] Foreign Application Priority Data

Jan. 28, 1983 [GB] United Kingdom ............... 8302453

[51] Int. Cl.$^4$ ............................................... B60T 3/00
[52] U.S. Cl. ..................................... 188/32; D12/217
[58] Field of Search ................. 188/32, 36, 5, 23, 4 R, 188/4 B; D12/217; 267/48

[56] References Cited

U.S. PATENT DOCUMENTS

| | | | |
|---|---|---|---|
| 1,145,304 | 7/1915 | Gillespie et al. | 267/48 |
| 2,461,535 | 2/1949 | Erhardt | 46/19 X |
| 2,954,101 | 9/1960 | Corson | D12/217 |
| 2,992,704 | 7/1961 | Showker et al. | D12/217 |
| 3,065,680 | 11/1962 | Weidman | 188/32 |
| 3,301,352 | 1/1967 | Corson | 188/32 |
| 3,557,909 | 1/1971 | Neumann | 188/32 |
| 3,664,466 | 5/1972 | Rotheiser | 188/32 |
| 3,993,167 | 11/1976 | Reed | 188/32 |
| 4,034,961 | 7/1977 | Breen | 188/32 |

FOREIGN PATENT DOCUMENTS 2340845 9/1977 France ................................. 188/32

OTHER PUBLICATIONS

Advertising brochure by Material Flow, Inc. of Chicago, Ill., copyright 1975, p. 23.
Advertising brochure by Mitchell Industrial Tire Co., Chattanooga, Tenn., Jul. 18, 1973.

Primary Examiner—Bruce H. Stoner, Jr.
Assistant Examiner—Michael P. Gilday
Attorney, Agent, or Firm—Mason, Fenwick & Lawrence

[57] ABSTRACT

A heavy duty chock, for use in preventing the movement of wheeled vehicles, particularly commercial or military aircraft, is triangular, preferably equitriangular in cross-section, has a longitudinal axis, and is divided transverse to its longitudinal axis into a number of triangular sections. The clock has an end section at each end thereof and a number of central sections located between the end sections. Each central section defines at least one space extending longitudinally therethrough. The end and central sections are formed from an elastomeric material which is a synthetic rubber, a natural rubber or a mixture thereof. The chock comprises clamping member, such as a flared hollow pipe, for holding the sections with adjacent triangular faces in tight abutment, and an interlock, such as co-operating abutments and recesses, for preventing relative rotational movement between adjacent sections about the longitudinal axis.

16 Claims, 6 Drawing Figures

HEAVY DUTY CHOCKS

This application is a continuation-in-part of my earlier application Ser. No. 06/497 101, filed on May 20, 1983, now abandoned.

The present invention relates to heavy duty chocks for use in preventing the movement of wheeled vehicles, such as heavy commercial and military transport and commercial and military aircraft.

At present, chocks for preventing the movement of wheeled vehicles are made from blocks of wood or steel frames. Such chocks generally have sufficient weight and ground grip to be able to prevent the movement of light transport, such as cars, vans and small lorries, and light aircraft under normal conditions. However, under adverse conditions, for instance high winds, icy ground or steep gradients, these chocks may not be able to prevent vehicle movement. Moreover, even under normal conditions, these chocks may be inadequate to prevent movement of heavy transport, such as heavy lorries and troop or equipment transporters, or commercial or military aircraft.

U.S. Pat. No. 4,034,961 (Breen) discloses a leveler and a retainer block for elevating the wheel of a vehicle, such as a camper trailer. The retainer may be used separately as a wheel chock. The retainer may be formed from a moulded plastic material with at least one arcuate face and an integrally formed web to increase its strength and rigidity. For a multi-wheeled vehicle, two retainers may be held in spaced-apart relation by threaded bolts.

An advertising brochure of the Mitchell Industrial Tire Co. apparently discloses a sectional rubber chock having the shape of an isosceles triangle.

U.S. Pat. No. 2,992,704 (Showker) discloses a lightweight aluminium aircraft chock which is movable by use of a rope attached through one end thereof.

U.S. Pat. No. 2,461,535 (Erhardt) relates to toy building blocks which interfit one with another whereby structures can be formed from the blocks. There is no teaching in this specification relating to heavy duty chocks.

U.S. Pat. No. 1,145,304 (Gillespie) relates to a spring for a motor vehicle comprising a number of leaves held together by straps and bolts. There is no teaching in this specification relating to heavy duty chocks.

An advertising brochure of Material Flow Inc. shows a chock constructed of all welded steel plate with tread base plate and cleats for positive locking action. The chock is painted bright yellow.

According to the present invention, there is provided a heavy duty chock for use in preventing the movement of wheeled vehicles, particularly commercial or military aircraft, the chock being triangular in cross-section, having a longitudinal axis, and being divided transverse to its longitudinal axis into a number of triangular sections, there being an end section at each end of the chock and a number of central sections located between the end sections, each central section defining at least one space extending longitudinally therethrough, the end and central sections being formed from an elastomeric material selected from the group consisting of synthetic rubber, natural rubber and blends thereof, the chock further comprising clamping means, for holding the sections with adjacent triangular faces in tight abutment, and interlock means, for preventing relative rotational movement between adjacent sections about the longitudinal axis.

Preferably, at least one, and advantageously all three of the apexes of each end and central section is cut off or rounded so that the chock is truncated along one or all three of its longitudinal edges. This construction has the advantage that exertion of force on the chock by the wheel will not trap the chock thereunder, so that it can be readily removed at any time.

Advantageously, the outside faces of each section are so formed that the longitudinal faces of the assembled chock are treaded, thereby to increase the group grip of the chock.

Preferably, the end and central sections define a bore extending longitudinally through the chock and the clamping means comprises an elongate member located in the bore, the elongate member being flared at both ends, one end having been flared after insertion of the elongate member into the bore.

Alternatively, the clamping means comprises an elongate member having a screw threaded portion on one end thereof and a nut screwed thereon. The end of the member remote from the nut may have on it a plate extending perpendicular to the axis of the member or may also be screw-threaded for receiving a second nut.

In another alternative, the elongate member may be flared at its end remote from the nut to form a rivet. In use the elongate member is located in a bore extending through all the sections and the sections are brought into tight abutment of screwing each nut onto the member.

The clamping means may include one or more washers located on the elongate member between the end sections of the chock and each nut or flared end.

Advantageously, in this case, each section has a countersunk well on its outside face for receiving each nut or plate.

Conveniently, the elongate member comprises a hollow pipe and the chock includes a rope located in the pipe to facilitate movement of the chock away from or towards the wheeled vehicle it is preventing from moving. Advantageously, the pipe is flared at one end to prevent chafing of the rope on the pipe.

Preferably the rope is knotted at both ends so that it can be used to pull the chock in either direction along its longitudinal axis.

Alternatively, one end of the elongate member may extend beyond the end section and is formed with an eye bolt in the part extending beyond the end section.

Preferably, the interlock means comprises at least one abutment on one triangular face of an end or central section and a recess for receiving the abutment on the triangular face of the adjacent section with which it is in abutment. Advantageously, each section has at least one abutment on one face and at least one recess on its other face. Alternatively, the chock comprises alternating a section having abutments on both its abutting faces and a section having recesses on both its abutting faces.

It will be clear that the sections at each end of the chock will only need to have abutments or recesses on one of their faces, since only one face will be in abutment with another section. The faces thereof which do not abut adjacent sections may be flat.

Alternatively, the interlock means may comprise a second clamping means of the type described above located in a second bore extending through all the sections.

Conveniently, the elastomeric material contains a filler and/or a reinforcing agent to increase its density and strength.

The chock may be made of any elastomeric material so long as it is hard wearing and resilient. Preferably, the elastomeric material is a synthetic rubber, such as a polyurethane rubber, a natural rubber, or a blend thereof. The rubber may be compounded and cured by conventional processing to give a hard wearing resilient material.

According to a second aspect of the present invention, there is provided a section of polymeric material for interlocking in an assembly of other similar sections to form a heavy duty chock in which adjacent faces of the sections are held in tight abutment.

Preferably, the chock has a colored surface at an least one of its longitudinal faces to provide a warning sign thereon. The surface may be coloured by pigments in the polymeric material, but preferably the colouring is obtained by painting on the surface or by applying a coloured adhesive tape thereto. The colouring is advantageously fluorescent so that the chock may be seen in the dark.

Each section may be coloured and the chock is assembled from sections of different colour so as to identify the owner of the chock (for instance one airway may have red white and blue coloured chocks, whereas another airway may have white, gold and blue chocks). The pattern of the coloured sections may also provide a warning signal.

Advantageously, each end and central section is equitriangular.

Typically the chock will be about 25 to 40 cm long and about 20 to 40 cm on each side for use with heavy transport, although larger sizes may be necessary for use with larger aircraft.

The chocks of the present invention will weigh for example in the range of 7 to 70 kg, preferably 10 to 12 kg.

Conveniently the sections are of equal thickness. A suitable section thickness is in the range 2 to 10 cm.

The chock of the present invention has the advantage that, because of its sectional structure, it can be made up to any length desired by using only two sorts of section.

The chock has the further advantage that its weight can be regulated by suitable choice of the size of the spaces in the central sections.

However, it has surprisingly been found that these central spaces have operational advantages. If a completely solid chock, such as that of the type shown in the Mitchell advertising brochure is used, it is found that a vehicle wheel can ride up and over the surface nearest it, thus overcoming the chocking effect. It could also, in some circumstances, tip the chock over. However, when the central spaces are provided, any force exerted on the chock surface by a wheel causes the surface to adopt a concave formation, thereby absorbing some of the force and transmitting the remaining force to the ground engaging surface. It thus becomes extremely difficult to overcome the chocking effect.

It is necessary for the chocks to be made of an elastomeric material so that it can deform as set out above to absorb any forces exerted thereon. It is also necessary that the sections be firmly clamped together and interlocked so that any forces exerted on the chock do not disrupt the chock by moving the sections out of alignment, thereby overcoming the chocking effect.

A further advantage of the chock is that the sections can be manufactured readily by normal rubber compounding and processing techniques. Using normal techniques it would not be possible to produce a heavy duty polymeric chock in a single piece. For instance, if the chock were to be made from a compounded rubber, it would be necessary to use very high pressures and long processing times to ensure complete and uniform curing of the rubber without destroying the integrity of the chock.

Since the chock is made of an elastomeric material, it can be made of sufficient weight to prevent movement of most wheeled vehicles. Moreover, since rubber has very good frictional properties, the ground grip of the chock will be very good. It is thus envisaged that the chock of the present invention will be able to prevent movement of most heavy wheeled vehicles, even under adverse conditions.

One embodiment of a chock according to the present invention is described, by way of example only, with reference to the accompanying drawings, in which.

Figure 1:
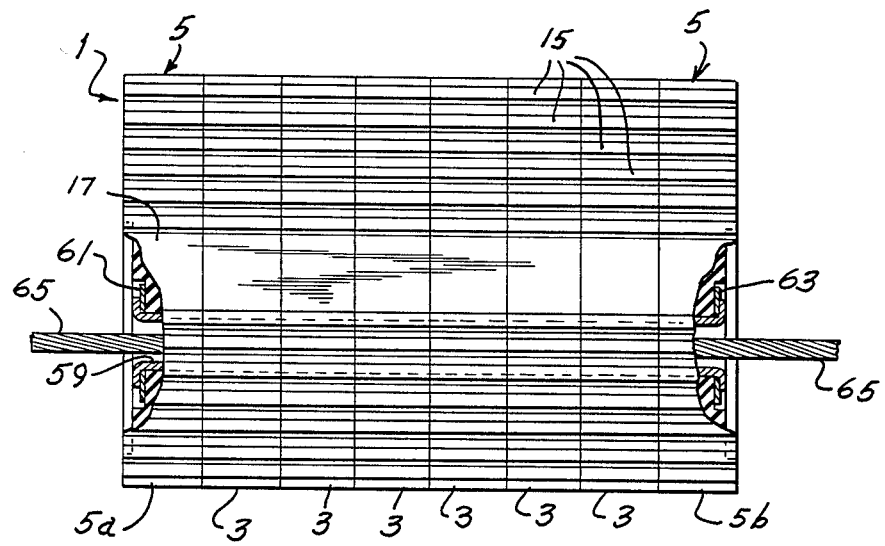
FIG. 1 is a side view, partly in section, of the chock.
Figure 2:
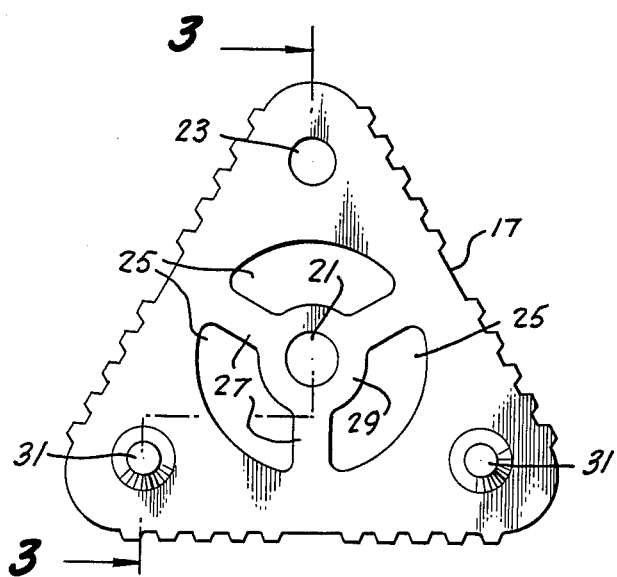
FIG. 2 is an end view of a central-section of the chock.

Referring now to the drawings, the chock 1 comprises six central sections 3 and two end sections 5. Each section is moulded from a blend of a natural rubber and a synthetic rubber. The rubber blend is similar to that used in making motor car tires and contains conventional fillers, reinforcing agents and compounding additives, such as antioxidants.

Each section is a transverse section of the chock 1 and is therefore triangular in cross-section. In the present case the cross-sectional shape is that of an equilateral triangle with each of its apexes rounded off.

The sides of the triangle are in practice about 30 cm long and each slice is about 5 cm thick so that the overall length of the chock is about 40 cm.

Each section also has a tread pattern 15 formed on each of its outside faces. The tread pattern has a surface 17 formed in the middle thereof for receiving paint or an adhesive tape to form a warning coloured area. The colour may be provided by sticking a fluorescent yellow and black banded tape thereon.

Each section may also be pigmented and a striped effect may be achieved by locating differently coloured sections adjacent each other.

Each of the central sections 3 has in it two longitudinally extending bores 21, 23, one 21 being located at the centre of the section, and the other 23 being located adjacent one apex of the section. Surrounding the central bore 21 are three longitudinally extending, equispaced, separate spaces 25 which are arcuate in cross-section. The spaces are separated from one another by radial webs 27 and from the central bore 21 by annular web 29.

Figure 3:
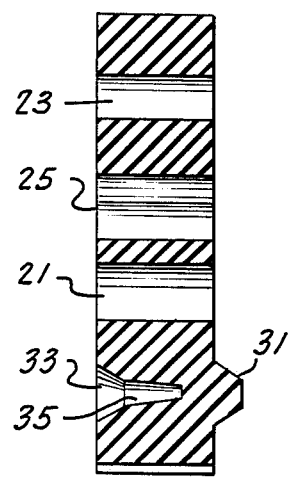
FIG. 3 is a sectional view taken along line 3—3 of FIG. 2.

On one triangular face of each central section are formed two abutments 31 located adjacent the other two apexes of the section 3, the abutments 31 and the apex bore 23 being arranged symmetrically. One of the abutments is shown clearly in FIG. 3.

In the other face of each central section are formed two recesses 33. As can be seen clearly from FIG. 3, these recesses 33 are axially aligned with the abutments 31 so that the abutments 31 on one section 3 can fit into the recesses 33 on an adjacent section.

Both the abutments 31 and the recesses 33 are tapered to facilitate assembly of the chock 1. The recesses 31 have tapered extensions 35 to facilitate production of the sections 3 by enabling better heat penetration into the elastomeric material, thereby reducing the time needed to cure the elastomeric material fully.

Figure 4:
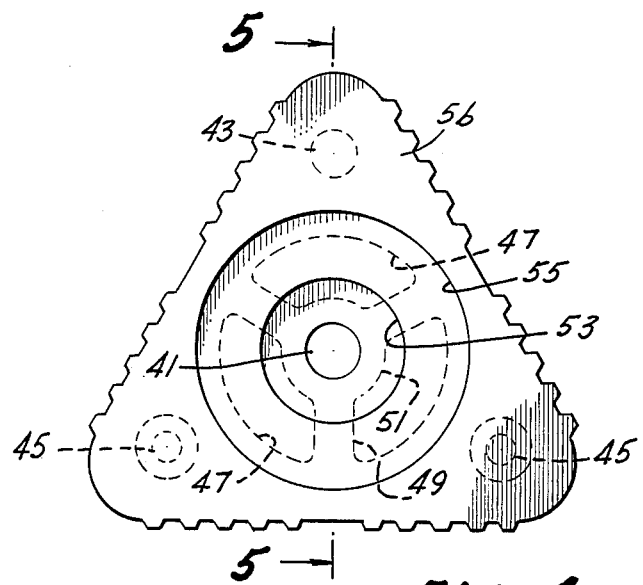
FIG. 4 is an end view of a female-type end section of the chock.
Figure 5:
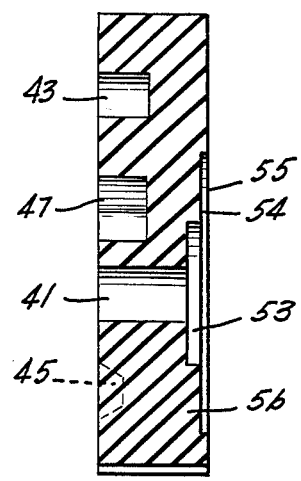
FIG. 5 is a sectional view taken along line 5—5 of FIG. 4.

There are two types of end section, the end section 5a being a male type and the end section 5b being of a female type. End section 5b is shown in FIGS. 4 and 5 to which particular reference is now made.

The section 5b has in it a longitudinally extending bore 41 located centrally in the section 5b for alignment with the central bores 21 in the central sections 3.

In the face of the section 5b which is to be adajcent a central section 3 are formed;

at one apex a well 43 for alignment with the apex bores 23 in the central sections 3;

at each of the other apexes a tapered recess 45 for receiving the abutments 31 on the central section 3 with which it is adjacent; and three blind, equispaced separate spaces 47 which are arcuate in cross-section for alignment with the spaces 25 in the central sections.

The spaces 47 in the end section are separated from one another and the central bore 41 by radial 49 and annular 51 webs.

In the face of the female end section 5b remote from the recesses 45 are formed two annular steps 53 and 55, the first step being of smaller radius than the second. The first step 53 is provided to facilitate assembly of the chock 1, as described in detail below. The second step 53 is provided to enable embossed printing to be formed on the recessed annular face 54 formed between the steps.

Figure 6:
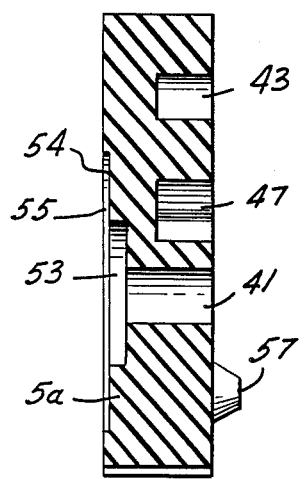
FIG. 6 is a similar view to that of FIG. 5 but of a male section.

It will be appreciated by those skilled in the art that the male section 5a shown in FIG. 6 is the mirror image of the female section 5b except that the recesses 45 in the female section 5b are replaced by tapered abutments 57 adapted to be fitted into the recesses 33 of its adjacent central section 3.

The chock is assembled by taking a hollow pipe 59 and flaring one end thereof. A washer 61 having an outside radius marginally smaller than that of the first step 53 and an inside radius marginally larger than that of the hollow pipe 59 is fitted over the hollow pipe 59 abutting the flared end thereof. The male end section 5a is fitted over the pipe 59 so that the washer 61 is located firmly in the recess created by the first step 53.

Central sections 3 are then fitted over the pipe 59 with their abutments 31 aligned with recesses 33 in adjacent sections 3 or in the adjacent end section 5b.

If desired, at this stage a further hollow pipe (not shown) can be fitted into the apex well 43 of the female section 5b and through the apex bores 23 in the central sections 3. This apex hollow pipe will then be trimmed so that it can be received in the apex well 43 of the male section 5a when it is fitted onto the chock 1. The apex pipe will provide further interlocking of the sections 3 and 5.

The female section 5b is then fitted over the hollow pipe 59 with its recesses 45 aligned with the abutments 31 on its adjacent central section 3. It is then ensured that all the abutments 57 and 31 are properly located in the appropriate recesses 33 or 45 so that adjacent faces of the sections 3 and 5 fully abut one another.

A second washer 63 of the same dimensions as the first washer 61 is then fitted over the hollow pipe 59 and is located in the recess formed by the first step in the male end section 5a. The end of the hollow pipe 59 protruding from the end section 5a is then flared to prevent the second washer from coming off the hollow pipe 59. Considerable force is exerted during the flaring operation so that the sections 3 and 5 are forced into and held in tight abutment.

Thus, in the assembled chock 1 the sections 3 and 5 will be held in tight abutment and the abutments will be located fully in the recesses. The interaction of the abutments and recesses ensures that the sections cannot rotate relative to one another about the chock's longitudinal axis. The chock therefore acts as a monolithic structure although it consists of a number of interlocking sections. This effect will be enhanced if the second hollow pipe is present in the chock.

A rope 65 is passed through the pipe 59 and knotted at each end (not shown) to facilitate movement of the chock in either direction.

The size of the chock 1 may be varied by appropriate selection of the number of central sections to be used. A longer pipe 23 may be needed to accommodate an increased number of sections.

The chock shown in FIG. 1 weighs between 10 and 12 kg, each section weighing about 1.5 kg.

The assembled chock 1, which is made of compounded rubber, will be heavier than a corresponding sized wood or steel frame chock and will have better ground grip property. It will therefore be effective in preventing the movement of wheeled vehicles under conditions in which conventional chocks could not be used.

Moreover, since it is constructed of sections, it will be readily produced and easily assembled in desired shape, size and colouring patterns.

In use, the chock will be advantageous in that, on exertion of force on the chock by a wheel, the chock will flex to absorb the force and transmit it to the ground engaging surface, thereby effecting a superior chocking action, without the chock becoming trapped under the wheel. With the chock of the present invention, there is very little danger of the wheel riding up or tipping over the chock.

It will of course be understood that the present invention has been described above purely by way of example, and modification of detail within the spirit and scope of the invention can be made.

What I claim is:

1. A heavy duty chock, for use in preventing the movement of wheeled vehicles, the chock being equilateral triangular in cross-section, having a longitudinal axis and three longitudinal edges, and divided transverse to its longitudinal axis into a number of equilateral triangular sections each having two triangular faces with adjacent sections having mutually facing triangular faces;

there being an end section at each end of the chock and a number of central sections located between the end sections;

each central section defining at least one space extending longitudinally therethrough;

the end and central sections being formed from an elastomeric material;

the chock having all three of its longitudinal edges truncated;

the chock further comprising clamping means, for holding the sections with adjacent triangular faces in tight abutment; and the chock further comprising male/female interlock means in adjacent abutting triangular faces of said sections and cooperating with said clamping means, for preventing relative rotational movement between adjacent sections about the longitudinal axis.

2. The heavy duty chock of claim 1, wherein the outside faces of each section are so formed that the longitudinal faces of the assembled chock are treaded, thereby to increase the ground grip of the chock when the chock is in any one of three possible positions with its longitudinal axis horizontally oriented.

3. The heavy duty chock of claim 1, wherein the end and central sections define a bore extending longitudinally through the chock and the clamping means comprises an elongate member located in the bore, the elongate member being flared at at least one of its ends.

4. The heavy duty chock of claim 3, wherein the elongate member comprises a hollow pipe and the chock includes a rope located in the pipe to facilitate movement of the chock.

5. The heavy duty chock of claim 3 wherein the elongate member is a pipe which is flared at both of its ends.

6. The heavy duty chock of claim 1, wherein the male/female interlock means comprises at least one abutment on one triangular face of each section and a recess for receiving the abutment on the triangular face of the adjacent section with which it is in abutment.

7. The heavy duty chock of claim 1, wherein the elastomeric material contains a material selected from the group consisting essentially of fillers and reinforcing agents.

8. The heavy duty chock of claim 1, wherein the chock has a colored surface on at least one of its longitudinal faces to provide a warning sign thereon.

9. A heavy duty chock, for use in preventing the movement of wheeled vehicles, comprising:

a main body member which is equilateral triangular in cross-section, and has a longitudinal axis and three longitudinal edges, and divided transverse to its longitudinal axis into a number of equilateral triangular sections each formed of elastomeric material and having two triangular faces with adjacent sections having mutually facing triangular faces;

there being an end section at each end of the main body member and a number of central sections located between the end sections;

each central section defining at least one space extending longitudinally therethrough;

an elongated member extending through all of said spaces and having engaging means at each end for engaging said end sections for clampingly holding the sections together with adjacent triangular faces in tight abutment; and mutually engaging interlock means on said faces cooperable with said elongated member for preventing relative rotational movement between adjacent sections.

10. The heavy duty chock of claim 9 wherein said central sections additionally include additional spaces positioned outwardly of said one space and extending longitudinally through each respective central section.

11. The heavy duty chock of claim 9, wherein the outside faces of each section are so formed that the longitudinal faces of the assembled chock are treaded, thereby to increase the ground grip of the chock when the chock is in any one of three possible positions with its longitudinal axis horizontally oriented.

12. The heavy duty chock of claim 11, wherein the elongated member comprises a hollow pipe and further including a rope located in the pipe to facilitate movement of the chock.

13. The heavy duty chock of claim 12, wherein said pipe is flared at both of its ends, said flared ends comprising said engaging means.

14. The heavy duty chock of claim 9, wherein the mutually engaging interlock means comprises at least one abutment on one triangular face of each section and a recess for receiving the abutment on the triangular face of the next adjacent section with which it is in abutment.

15. The heavy duty chock of claim 10, wherein said additional spaces are arcuate in cross-section.

16. The heavy duty chock of claim 15, wherein said additional spaces comprise three spaces of equal size which are equidistantly spaced outwardly of said one space of each respective central section.

* * * * *